Jan. 3, 1967 A. L. LEE ETAL 3,295,624

POWER DRIVEN STEERABLE WHEEL ASSEMBLY

Filed March 7, 1966 5 Sheets-Sheet 1

INVENTORS.
ARTHUR L. LEE,
ARTHUR B. COVAL.
BY
Stanley J. Price, Jr.
their ATTORNEY

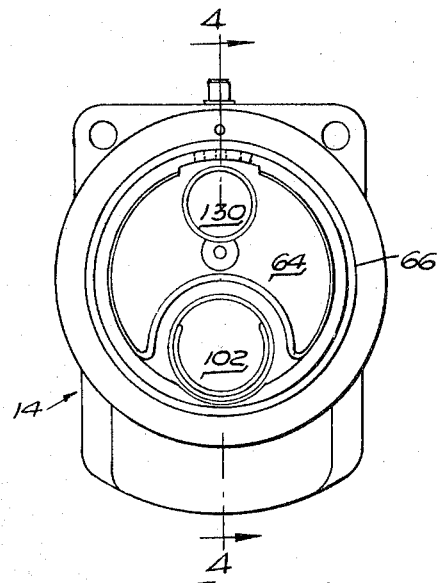
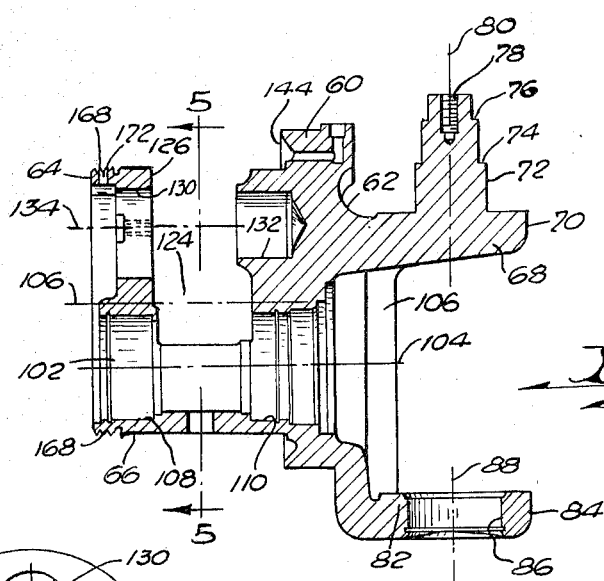
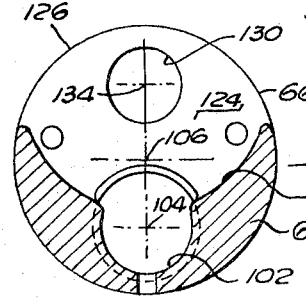

INVENTORS
ARTHUR L. LEE,
ARTHUR B. COVAL.
BY
Stanley J. Price, Jr.
their
ATTORNEY Jan. 3, 1967  A. L. LEE ETAL  3,295,624
POWER DRIVEN STEERABLE WHEEL ASSEMBLY
Filed March 7, 1966  5 Sheets-Sheet 4
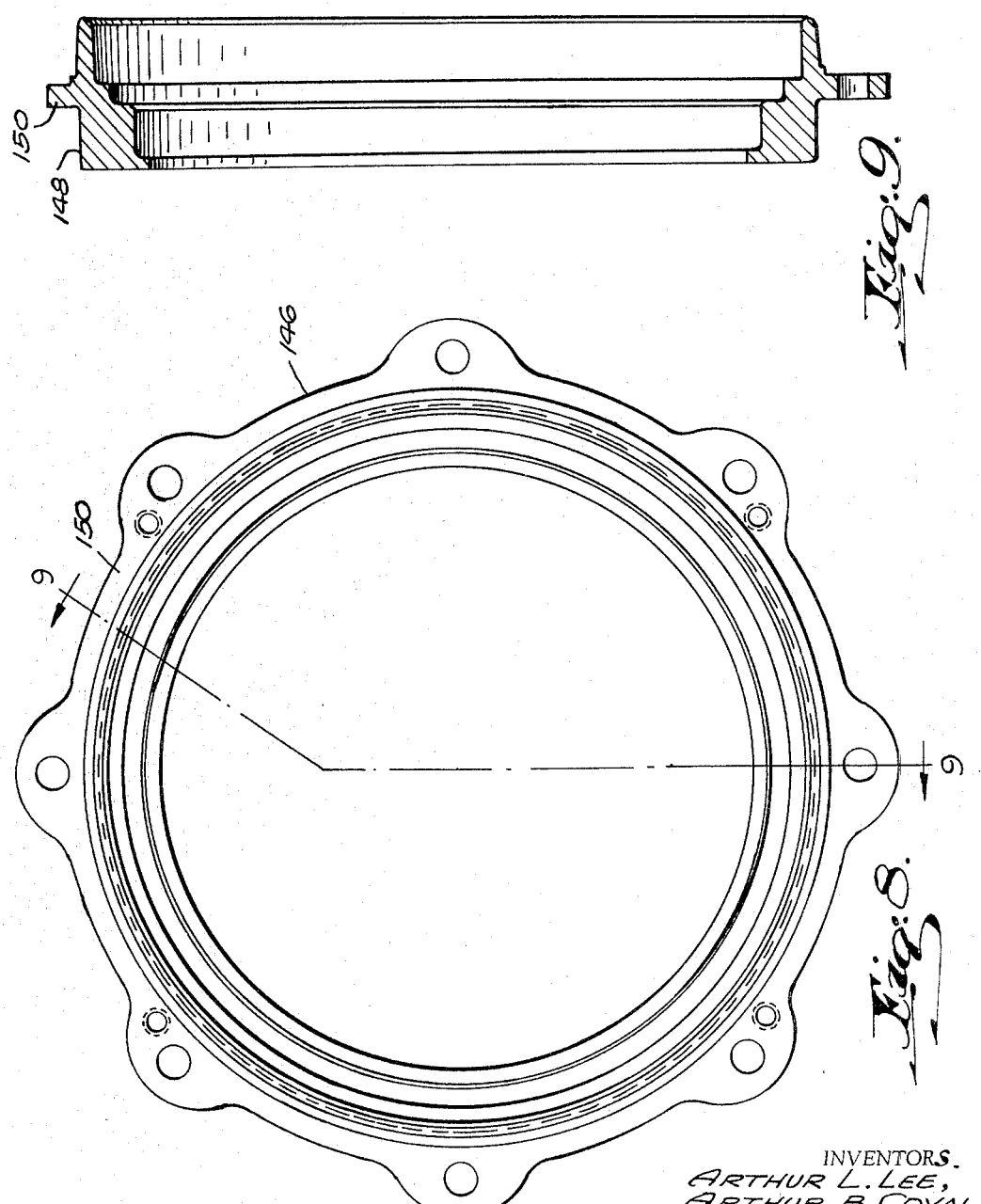
INVENTORS.
ARTHUR L. LEE,
ARTHUR B. COVAL.
BY
Stanley J. Price, Jr.
their
ATTORNEY Jan. 3, 1967　　　A. L. LEE ETAL　　　3,295,624
POWER DRIVEN STEERABLE WHEEL ASSEMBLY
Filed March 7, 1966　　　　　　　　　　5 Sheets-Sheet 5
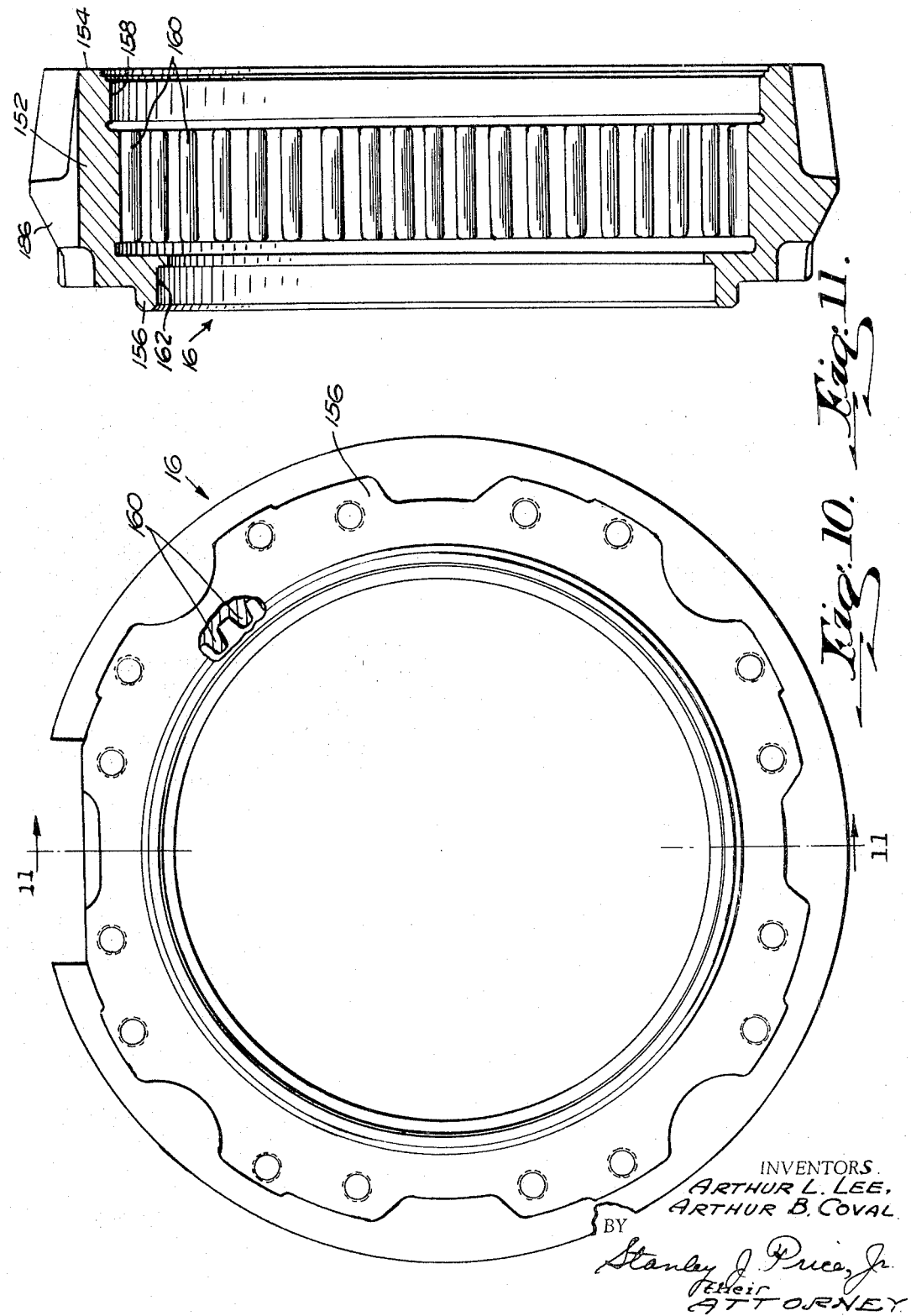
INVENTORS.
ARTHUR L. LEE,
ARTHUR B. COVAL
BY
Stanley J. Price, Jr.
their
ATTORNEY

United States Patent Office 3,295,624
Patented Jan. 3, 1967

3,295,624
POWER DRIVEN STEERABLE WHEEL ASSEMBLY
Arthur L. Lee and Arthur B. Coval, both of Columbus, Ohio, assignors to Consolidation Coal Company, Pittsburgh, Pa., a corporation of Pennsylvania
Filed Mar. 7, 1966, Ser. No. 532,454
5 Claims. (Cl. 180—43)

This invention relates to a power driven steerable wheel assembly and more particularly to a power driven steerable wheel assembly for low height shuttle cars and like vehicles.

In underground mines where coal or the like is found in relatively thin seams, shuttle type vehicles are used to transport the dislodged material from the mine face to the endless conveyor belt or rail type fixed haulage means. The low height shuttle car, to be economically feasible, must carry substantial loads and must, therefore, be rugged in construction. All of the wheels on a four wheel low height shuttle car are power driven and also steerable to permit the car to travel through the relatively narrow interconnected entries or passageways. The shuttle car height limitations governed by the seam thickness, the shuttle car width limitations governed by the relatively narrow haulageways and the economic necessity of hauling substantial loads in the shuttle car present problems in the design of a suitable power driven and steerable wheel assembly that will not require maintenance and replacement for substantial periods of time.

It is, accordingly, the principal object of this invention to provide a power driven steerable wheel assembly that is compact and rugged in construction.

A further object of this invention is to provide a power driven steerable wheel assembly that has the drive axis located below the wheel axis of rotation.

A further object of this invention is to provide a power driven and steerable wheel assembly that has spindle connections both above and below the universal joint shaft.

This invention comprises the new and improved construction and combination of parts and their operating relation to each other which will be described more fully hereinafter and the novelty of which will be more particularly pointed out and distinctly claimed.

In the accompanying drawings, to be taken as a part of the specification, there is clearly and fully illustrated a preferred embodiment of this invention, in which drawings:

FIGURE 3 is a front view of the spindle member.

FIGURE 4 is a view in section taken along the line 4—4 in FIGURE 3.

FIGURE 5 is a view in section taken along the line 5—5 in FIGURE 4.

FIGURE 8 is an enlarged view in front elevation of the rear bearing carrier for the ring gear.

FIGURE 9 is a view in section taken along the line 9—9 of FIGURE 8.

FIGURE 10 is a view in front elevation of the annular driven member with a portion broken away to illustrate the ring gear.

FIGURE 11 is a view in section taken along the line 11—11 of FIGURE 10.

Figure 1:
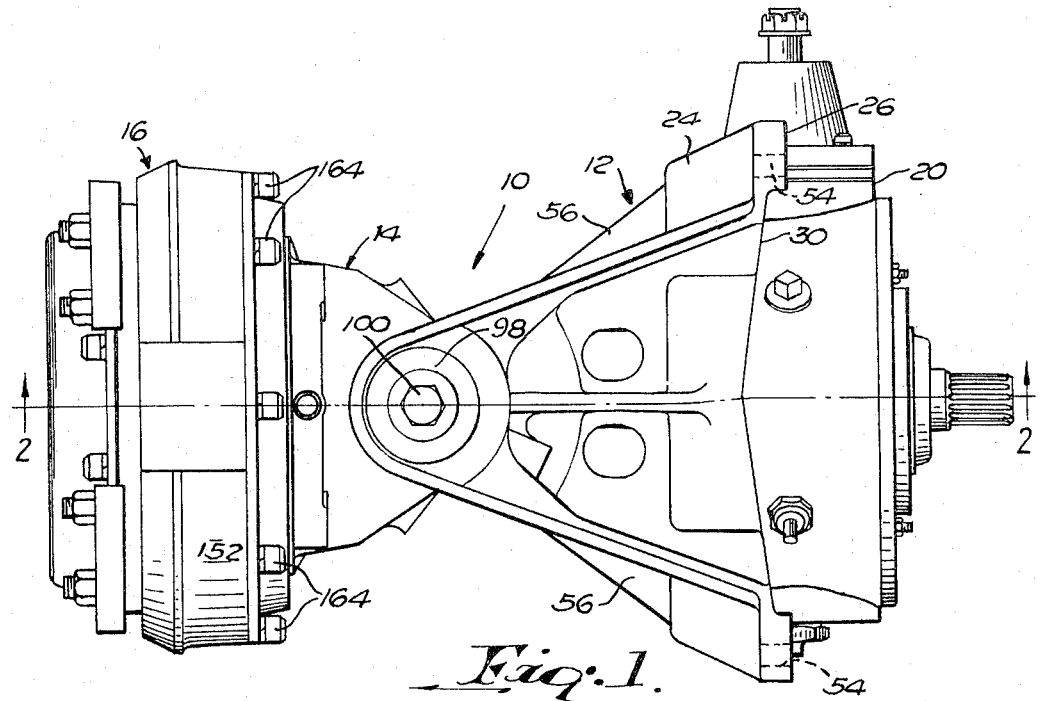
FIGURE 1 is a top plan view of our improved wheel unit.
Figure 2:
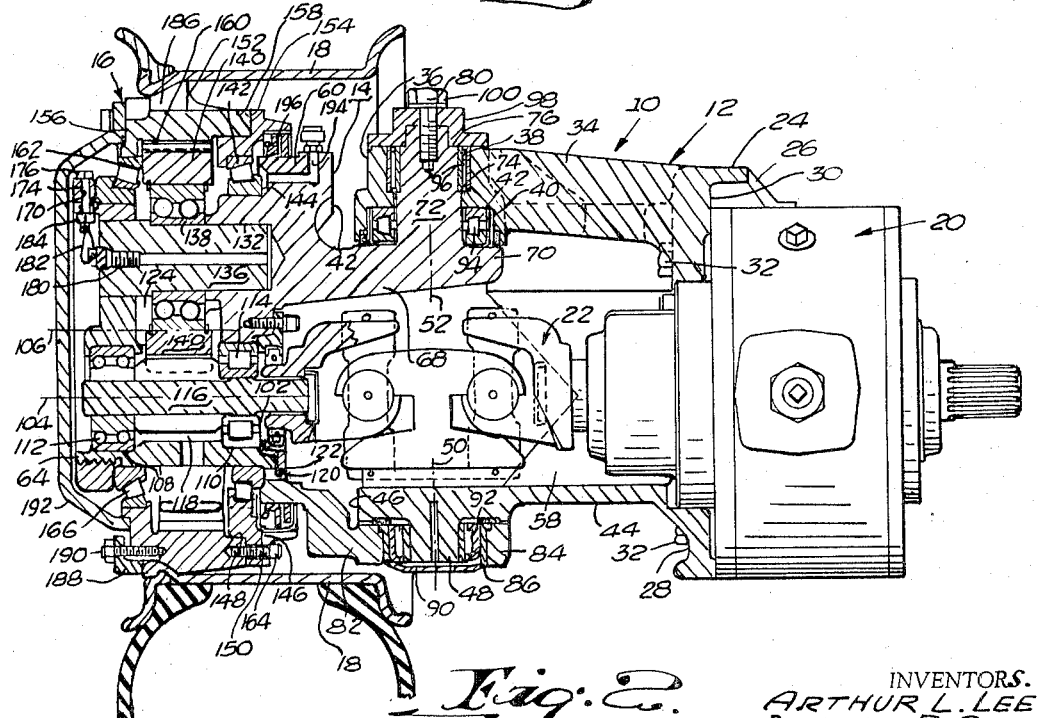
FIGURE 2 is a view in section taken along the lines 2—2 of FIGURE 1 illustrating the differential and universal connecting mechanism in full lines.
Figure 6:
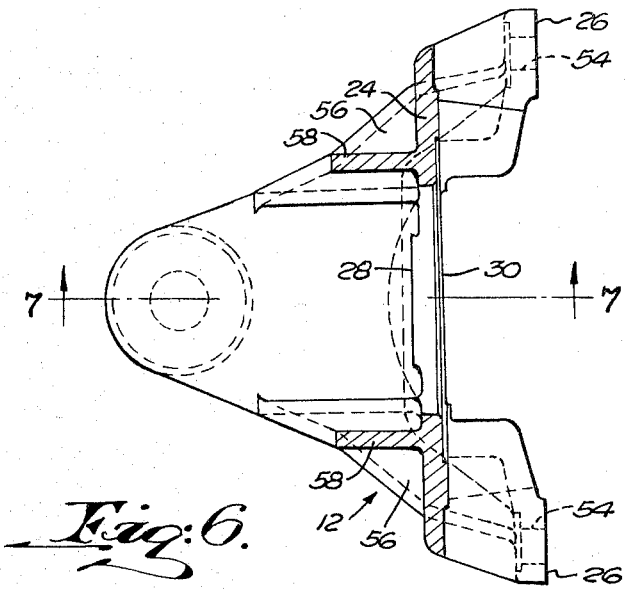
FIGURE 6 is a top plan view in section of the spindle bracket taken along the line 6—6 in FIGURE 7.
Figure 7:
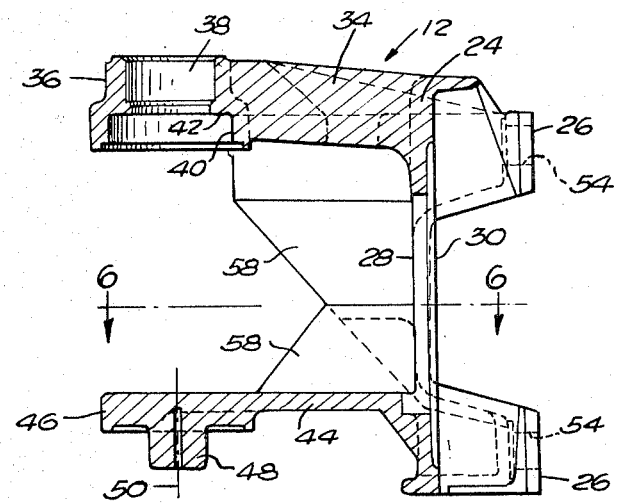
FIGURE 7 is a view in vertical section taken along the line 7—7 in FIGURE 6.

Referring to the drawings and particularly to FIGURE 2, there is illustrated our improved wheel unit 10 that has a spindle bracket generally designated by the numeral 12.

The spindle bracket 12 is secured to the haulage vehicle and has a spindle member generally designated by the numeral 14 pivotally connected thereto. The spindle member 14 has an annular driven member 16 rotatably secured thereto on which a wheel rim 18 is mounted. The spindle member 14 has gearing and shafting therein that interconnects the output shaft from the differential 20 with the annular driven member 16, as will be later described in greater detail. A universal 22 interconnects the differential output shaft with the gearing and shafting within the spindle member 14 so that there is provided a wheel unit 10 that pivots about the pivotal connection between the spindle bracket 12 and spindle 14. Mounted on the spindle 14 is an annular driven member 16 with a wheel rim 18 mounted thereon that is driven by the gearing and shafting within the spindle member 14.

Referring in greater detail to the various components of our improved wheel unit 10, the spindle bracket 12 illustrated in detail in FIGURES 1, 2, 6 and 7 has a vertical body portion 24 with a rear wall 26 and a front wall 28. There is a recessed portion 30 in the rear wall that receives the differential 20. Bolts 32 secure the differential 20 to the spindle bracket body portion 24. Extending laterally from the spindle bracket body portion 24 is an upper arm member 34 which has an end portion 36 with a vertical pin receiving passageway 38 extending vertically therethrough. The passageway 38 has an enlarged portion 40 with a shoulder portion 42.

Also extending laterally from the body portion 24 is a lower arm member 44 with an end portion 46. Depending downwardly from the arm portion 44 adjacent the end portion 46 is a pin 48 that has a longitudinal axis 50. The passageway 38 in the upper arm 34 has an axis 52 which is aligned with the axis 50 of pin 48. The spindle bracket body portion 24 has a plurality of apertures 54 therethrough for bolt means to connect the bracket member to the haulage vehicle. There are provided gussets 56 and web portions 58 to provide rigidity and strength for the spindle bracket arms 34 and 44.

The spindle member 14 illustrated in FIGURES 2, 3, 4 and 5 has a body portion 60 with a rear wall 62, front wall 64 and cylindrical side wall 66. Extending rearwardly from the body portion rear wall 62 is an upper arm member 68 that has an end portion 70 with an upwardly extending pin 72. The pin 72 has a first shoulder portion 74, a second shoulder portion 76 and a vertical threaded bore 78. The pin 72 has a longitudinal axis 80. Extending rearwardly from the spindle member body portion rear wall 62 is a lower arm member 82 that has an end portion 84 and a passageway 86 extending vertically therethrough. The passageway 86 has an axis 88 that is aligned with the axis 80 of the pin member 72.

The upwardly extending pin member 72 on the spindle member upper arm 68 is positioned in the passageway 38 of spindle bracket upper arm 34 and the depending pin portion 48 on spindle bracket lower arm 44 is positioned in the vertical passageway 86 in spindle member lower arm 82. A suitable cap member 90 (FIGURE 2) is positioned in the passageway 86 and receives therein needle bearings 92 between the depending pin 48 and the side walls of the passageway 86. In the passageway 38 of spindle bracket upper arm 34 a roller bearing 94 is positioned in abutting relation with the passageway shoulder 42. A needle bearing 96 is positioned in the passageway 38 above the roller bearings 94. The upwardly extending pin 72 on spindle member arm 68 is positioned in the spindle bracket passageway 38 and a spindle keeper 98 is positioned in overlying relation with the upper edge of the pin 72 and the upper surface of spindle bracket arm 34. Bolt 100 extends through an aperture in the spindle keeper 98 and is secured in the vertical threaded bore 78 in upwardly extending pin 72. The longitudinal axes of the depending pin 48 on spindle bracket arm 44 and the upwardly extending pin 72 on spindle member arm 68 are aligned so that the spindle member 14 pivots about the aligned longitudinal axes 80 and 50 of the respective pins 72 and 48.

With this arrangement the pivot members which comprise the pins 72 and 48 are spaced from each other on opposite sides of the universal member 22. Support is provided for the spindle member 14 adjacent its lower edge portion by means of the interconnected arms 82 and 44 on the spindle and spindle bracket and adjacent the upper portion of the spindle member 14 by means of the interconnected arms 68 and 34 of the spindle member and spindle bracket respectively. The load exerted on the pivotal connection between the spindle 14 and spindle bracket 12 is distributed to both of the arms to thereby distribute the bending stresses to both of the arms.

The spindle member body portion 60 has a main drive shaft passageway 102 extending horizontally therethrough and has an axis 104. The spindle member body portion 60 has a longitudinal axis 106 which is spaced above the axis of the main drive shaft passageway 102. In FIGURE 5 the relative location of the main passageway axis 104 and the spindle member body portion axis 106 is clearly illustrated. The passageway 102 has bearing receiving portions 108 and 110 adjacent the front and rear walls 64 and 62. Bearings 112 and 114 are positioned in the respective receivers 108 and 110 (FIGURE 2). A drive shaft 116 is positioned in the passageway 102 and suitably supported on bearings 112 and 114. The drive shaft 116 has an externally toothed gear 118 formed thereon. An annular seal carrier 120 is positioned around a portion of the universal 22 that is connected to shaft 116. The annular seal carrier 120 is suitably secured to the spindle body portion 60 by means of bolts 122.

The spindle body portion 60 has a vertical chamber 124 between the front wall 64 and rear wall 62. The chamber has an open top portion 126 and is clearly illustrated in FIGURES 4 and 5. It should be noted in FIGURE 5 that the chamber 124 has a lower wall 128 so that a substantial portion of the spindle member body portion 60 below the chamber wall 128 is of solid construction to provide a rigid and strong spindle member 14. The spindle body portion 60 has idler shaft passageways 130 and 132 on opposite sides of the chamber 124. The passageways 130 and 132 are aligned and have a common axis 134 which is parallel to the axis 104 of passageway 102. The axis 134 of the idler shaft passageways is positioned above the axis 104 of the main drive shaft passageway 102 with the central axis 106 of the spindle member body portion 60 therebetween. An idler shaft 136 (FIGURE 2) is positioned in the passageways 130 and 132 and has a roller bearing 138 positioned thereon. Suitable shoulder means are provided on the idler shaft 136 to maintain the inner race of bearing 138 in nonrotatable relation with the shaft 136. A spur gear 140 is secured to the outer race of bearing 138 and rotates therewith. The spur gear 140 meshes with the externally toothed gear portion 118 on main drive shaft 116 so that rotation of the main drive shaft 116 is transmitted to the spur gear 140.

A roller bearing 142 is positioned on the spindle member body portion outer cylindrical surface 66 and abuts a radially outwardly extending shoulder 144 on the spindle member body portion 60. An annular bearing carrier 146 (FIGURES 2, 8 and 9) is mounted on the annular bearing 142 so that the annular bearing carrier 146 is rotatable relative to the spindle member body portion 60. The annular bearing carrier has an annular cylindrical surface 148 and a radially extending shoulder portion 150. The annular driven member 16 (FIGURES 2, 10 and 11), also referred to as a ring gear assembly, has a body portion 152 with a rear end wall 154 and a front end wall 156. The annular driven member 16 has an inner wall 158 with inwardly extending gear teeth 160 extending radially therefrom. The gear teeth 160 form an internal toothed geared portion on the body portion 152. The body portion 152 has an inwardly extending annular bearing receiving portion 162 adjacent the front wall 156. The annular driven member 16 is coaxially positioned on the spindle body portion 60 with the annular driven member body portion inner surface 158 abutting the external surface 148 of bearing carrier 146 and the rear wall 154 abutting the bearing carrier shoulder 150. Suitable bolts 164 secure the annular driven member body portion 152 to the bearing carrier 146, as is illustrated in FIGURE 2. A second annular bearing 166 is positioned in the annular bearing receiver 162 adjacent the front end wall of the ring gear body portion 152 with the inner race abutting the spindle member body portion cylindrical wall 66.

The spindle member body portion 60 has a threaded end portion 168 on which an annular bearing keeper 170 is threaded to maintain the roller bearing 166 in operative position relative to the annular driven member 16 and the spindle member body portion 60. The spindle member body portion has a vertical aperture 172 therethrough adjacent the front end portion 64. The bearing keeper 170 has a vertical passageway 174 therethrough which is aligned with the vertical aperture 172 in the spindle member body portion. A bolt 176 extends through the aligned apertures and maintains the bearing keeper 170 in fixed position on the spindle member body portion 60. The idler shaft 136 has a threaded passageway 178 therethrough in which bolt 180 is positioned. Safety wire means 182 is provided to maintain the nut 184 on bolt 180 and to prevent rotation of idler shaft 136. The annular driven member 16 is thus rotatably positioned on the spindle member body portion cylindrical surface 66.

The ring gear 160 on the power driven member 16 meshes with the spur gear 140 rotatably mounted on idler shaft 136. With this arrangement rotation of drive shaft 116 is transmitted through spur gear 140 to ring gear 160 to drivingly rotate the driven member 16 relative to the spindle member 14. The annular driven member body portion 152 has a conical external portion 186 on which the wheel rim 18 is mounted, as is illustrated in FIGURE 2. A plurality of rim securing members 188 abut the edge of the wheel rim 18 and are secured to the annular driven member 16 by means of bolts 190. A wheel cover 192 is secured to the front wall of the annular driven member 16 and rotates therewith. The spindle member body portion 60 has suitable passageways 194 therethrough to the inner chanmber 124 for supplying lubricant thereto and suitable annular seals 196 to retain the lubricant within the chamber 124.

With the heretofore described structure, there is provided a compact steerable and driven wheel unit 10 that has a spindle bracket 12 adapted to be secured to the vehicle. The spindle bracket 12 has a recessed portion 30 in its rear wall for receiving a differential 20. The differential 20 has an output shaft that is connected to the main drive shaft 116 within the spindle 14 so that rotation is transmitted from a propelling means through the differential 20 and universal joint 22 to the main drive shaft 16. The spindle member 14 is connected to the spindle bracket 12 by means of a pair of vertical pins spaced above and below the universal 22 to provide spaced pivotal supports for the spindle member 14.

The spindle body portion 60 has a chamber 124 therein in which there is positioned an idler gear 140 supported on an idler shaft 136. The idler gear meshes with a gear on the main drive shaft 116 and with the ring gear portion 160 of the annular driven member 16. The axis 104 of the main drive shaft 116 is positioned below the axis 106 of the spindle body portion 60 and the idler shaft axis 134 is positioned above the spindle body portion axis 106. This construction permits the wheel unit to be secured to the vehicle at a location relatively close to the ground. Support means are symmetrically provided on opposite sides of the drive gearing to minimize bending moments in the drive gearing and provide a rugged drive train that is sturdy in construction and relatively maintenance free.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

We claim:
1. In a power driven steerable wheel assembly the combination comprising,
   a spindle bracket having a body portion with an upper arm member and a lower arm member extending laterally from one side of said body portion, said arm members arranged in spaced relation to each other,
   said spindle bracket body portion having a recessed portion opposite said laterally extending arms and a horizontal passageway therethrough,
   a differential member positioned in said recessed portion and secured to said spindle bracket body portion,
   said differential member having an output shaft extending laterally therefrom through said horizontal passageway,
   said spindle bracket laterally extending upper arm member having an end portion with a vertical passageway therethrough,
   said spindle bracket lower arm having an end portion with a downwardly projecting pin portion, said pin portion aligned with said passageway in said upper arm member,
   a spindle member having a body portion with a cylindrical side wall, a front wall and a rear wall, said spindle member body portion having a horizontally extending main shaft passageway extending therethrough parallel to and spaced below the longitudinal axis of said spindle member body portion,
   said spindle member body portion having an upper arm member and a lower arm member extending laterally from said body portion rear wall, said arm members arranged in spaced relation to each other with said main shaft passageway therebetween,
   said spindle member upper arm member having an end portion with an upwardly projecting pin portion,
   said spindle member lower arm member having an end portion with a vertical passageway therethrough aligned with said upper arm member upwardly projecting pin portion,
   said spindle member having said upper arm upwardly projecting pin portion positioned in said spindle bracket upper arm vertical passageway and said spindle bracket lower arm downwardly projecting pin portion positioned in said spindle member lower arm vertical passageway to thereby pivotally connect said spindle member to said spindle bracket member for pivotal movement of said spindle member about the aligned vertical axes of said upwardly extending pin portion on said spindle member upper arm and said downwardly extending pin portion on said spindle bracket lower arm member,
   said spindle member body portion having a vertical chamber opening into said main shaft passageway, said spindle body portion having an opening into said chamber adjacent the upper portion thereof,
   said spindle member body portion having an idler shaft passageway positioned above said main shaft passageway in spaced parallel relation thereto,
   a main drive shaft rotatably positioned in said main drive shaft passageway and having an externally toothed gear portion in said chamber,
   an idler shaft nonrotatably positioned in said idler shaft passageway,
   an idler gear rotatably positioned on said idler shaft in said chamber in meshing relation with said externally toothed gear portion of said main drive shaft, a portion of said idler gear extending through said top opening in said chamber,
   an annular driven member rotatably positioned on said spindle member body portion cylindrical side wall, said annular driven member having an internally toothed gear portion in meshing relation with said idler gear extending through said opening in said chamber so that rotation of said main drive shaft rotates said annular driven member relative to said spindle body portion,
   universal means connecting said differential member output shaft with said main drive shaft, and
   said universal means having a vertical pivot axis aligned with the longitudinal axis of said vertical projecting pin portions on said spindle member arm members.

2. In a power driven steerable wheel assembly as set forth in claim 1 which includes,
   a wheel mounted on said annular driven member,
   said wheel having an axis,
   said wheel axis arranged parallel to said main drive shaft longitudinal axis and said idler shaft longitudinal axis,
   said wheel axis positioned above said main drive shaft longitudinal axis and below said idler shaft longitudinal axis.

3. In a power driven steerable wheel assembly as set forth in claim 1 which includes,
   a first annular bearing positioned on said spindle member body portion cylindrical side wall adjacent said spindle member body portion rear wall,
   an annular bearing carrier coaxially positioned on said annular bearing member and secured to said annular driven member,
   a second annular bearing means positioned on said spindle member body portion cylindrical side wall adjacent said spindle member body front edge portion,
   said spindle member body portion cylindrical side wall having a threaded portion adjacent said front wall,
   an annular bearing retainer threadedly secured on said threaded portion and arranged to maintain said annular driven member rotatably positioned on said spindle member body portion with said pair of annular bearings therebetween.

4. In a power driven steerable wheel assembly as set forth in claim 1 which includes,
   annular seal means positioned around said main drive shaft and a portion of said universal means and abutting said spindle member body portion rear wall,
   a seal carrier secured to said spindle member body portion to maintain said seal means on said spindle member body portion.

5. In a power driven steerable wheel assembly as set forth in claim 1 which includes,
   cap means positioned in abutting relation with said spindle bracket upper arm member in overlying relation with said upper arm member vertical passageway and said spindle member upwardly projecting pin portion,
   means to secure said cap member to said spindle member upwardly projecting pin portion to pivotally secure said spindle member to said spindle bracket.

References Cited by the Examiner
UNITED STATES PATENTS
2,924,288  2/1960  Lee _____ 180—43

FOREIGN PATENTS
291,896  7/1965  Netherlands.

A. HARRY LEVY, *Primary Examiner.*